United States Patent
Morita et al.

(10) Patent No.: US 12,306,953 B2
(45) Date of Patent: May 20, 2025

(54) INTRUSION ANOMALY MONITORING ANALYSIS DEVICE IN VEHICLE ENVIRONMENT THAT DETECTS AND RESPONDS TO SECURE BOOT PROCESSING TAMPERING

(71) Applicant: HITACHI ASTEMO, LTD., Hitachinaka (JP)

(72) Inventors: Nobuyoshi Morita, Tokyo (JP); Yasuhiro Fujii, Tokyo (JP); Masashi Yano, Tokyo (JP); Mikio Kataoka, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 18/257,961

(22) PCT Filed: Aug. 26, 2021

(86) PCT No.: PCT/JP2021/031266
§ 371 (c)(1),
(2) Date: Jun. 16, 2023

(87) PCT Pub. No.: WO2022/190408
PCT Pub. Date: Sep. 15, 2022

(65) Prior Publication Data
US 2024/0045970 A1 Feb. 8, 2024

(30) Foreign Application Priority Data

Mar. 9, 2021 (JP) .................................. 2021-037773

(51) Int. Cl.
*G06F 21/57* (2013.01)
*G06F 21/55* (2013.01)

(52) U.S. Cl.
CPC .......... *G06F 21/575* (2013.01); *G06F 21/554* (2013.01)

(58) Field of Classification Search
CPC .............................. G06F 21/575; G06F 21/554
See application file for complete search history.

(56) References Cited

U.S. PATENT DOCUMENTS 7,343,239 B2 * 3/2008 Tanabe ...................... G06F 8/65
365/185.18
10,673,880 B1 * 6/2020 Pratt ................... H04L 63/1425
(Continued)

FOREIGN PATENT DOCUMENTS

| JP | H04-107631 A | 4/1992 |
| JP | 6184575 B1 | 8/2017 |

(Continued)

OTHER PUBLICATIONS

International Search Report with English Translation and Written Opinion of International Patent Application No. PCT/JP2021/031266 dated Nov. 9, 2021 (9 pages).
(Continued)

*Primary Examiner* — Tammara R Peyton
(74) *Attorney, Agent, or Firm* — Foley & Lardner LLP

(57) ABSTRACT

Provided is an analysis device that reduces false detection of an attack event to appropriately output an anomaly notification.

The analysis device configured to be communicable with a plurality of monitoring-target devices collects monitoring results of each of the monitoring-target devices, determines whether an anomaly has occurred in each of the monitoring-target devices, based on the monitoring results, and determines whether to output an anomaly notification indicating the anomaly, based on a result of the determination and code verification results of each of the monitoring-target devices.

8 Claims, 9 Drawing Sheets

(56) References Cited

U.S. PATENT DOCUMENTS

| 12,039,050 B2* | 7/2024 | Morita .................... G06F 8/656 |
| 2017/0270291 A1 | 9/2017 | Suzuki et al. |
| 2021/0194904 A1* | 6/2021 | Zhang .................. G05D 1/0088 |
| 2021/0237665 A1 | 8/2021 | Tamura et al. |

FOREIGN PATENT DOCUMENTS

| JP | 2017-167916 A | 9/2017 |
| JP | 2019-125344 A | 7/2019 |
| WO | WO-2020/090146 A1 | 5/2020 |

OTHER PUBLICATIONS

Extended European Search Report issued in corresponding EP Application No. 21930257.7, dated Dec. 6, 2024 (10 pages).

* cited by examiner

IN-VEHICLE DEVICE A

| ANOMALY ID (1011) | ANOMALY CONTENT (1012) | ANOMALOUS PLACE (1013) | TIME (OPERATION PERIOD) (1014) |
|---|---|---|---|
| 0 x 0 0 1 | ACCESS BY UNREGISTERED TERMINAL | Ch 1 | 2020/02/01 11:10:20 |
| 0 x 0 0 1 | ACCESS BY UNREGISTERED TERMINAL | Ch 1 | 2020/02/02 11:12:30 |
| 0 x 0 0 2 | AUTHENTICATION OF COMMUNICATION FROM OUTSIDE VEHICLE FAILS | Ch 1 | 2020/02/03 13:10:20 |
| ... | ... | ... | ... |

IN-VEHICLE DEVICE...

| ANOMALY ID | ANOMALY CONTENT | ANOMALOUS PLACE | TIME (OPERATION PERIOD) |
|---|---|---|---|
| 0 x 0 0 3 | UNAUTHORIZED ID COMMUNICATION | Ch 2 | 2020/02/04 18:35:20 |
| 0 x 0 0 4 | UNAUTHORIZED PERIODIC COMMUNICATION | Ch 2 | 2020/02/04 18:35:21 |
| ... | ... | ... | ... |

THIS MAY BE BASED ON THE NUMBER OF TIMES

THIS MAY BE BASED ON THE NUMBER OF TIMES

| DAMAGED DEVICE (1031) | AFFECTED DESTINATION (1032) | MONITORING-TARGET GROUP ID (1033) |
|---|---|---|
| IN-VEHICLE DEVICE A | {IN-VEHICLE DEVICE D} | {0x01} |
| IN-VEHICLE DEVICE B | {IN-VEHICLE DEVICE D} | {0x02} |
| IN-VEHICLE DEVICE C | {IN-VEHICLE DEVICE D, IN-VEHICLE DEVICE E}, {IN-VEHICLE DEVICE F} | {0x03, 0x04} |
| IN-VEHICLE DEVICE D | {IN-VEHICLE DEVICE A}, {IN-VEHICLE DEVICE B}, {IN-VEHICLE DEVICE C, IN-VEHICLE DEVICE E}, {IN-VEHICLE DEVICE G} | {0x01, 0x02, 0x03, 0x05, ...} |
| ... | ... | ... |

FIG. 8A

| IN-VEHICLE DEVICE ID | A | B | C | D | E | F | G | H | ... |
|---|---|---|---|---|---|---|---|---|---|
| PRESENCE OR ABSENCE OF VIOLATION | 0 | 0 | 0 | 1 | 0 | 0 | 0 | 0 | ... |

| MONITORING-TARGET GROUP ID | RELEVANT DEVICE | VIOLATION SITUATION | THRESHOLD |
|---|---|---|---|
| 0 x 0 1 | {IN-VEHICLE DEVICE A, IN-VEHICLE DEVICE D} | { 1 , 1 } | 1 |
| 0 x 0 2 | {IN-VEHICLE DEVICE B, IN-VEHICLE DEVICE D} | { 0 , 1 } | 1 |
| 0 x 0 3 | {IN-VEHICLE DEVICE C, IN-VEHICLE DEVICE D, IN-VEHICLE DEVICE E} | { 0 , 0 , 0 } | 2 |
| 0 x 0 4 | {IN-VEHICLE DEVICE C, IN-VEHICLE DEVICE F} | { 0 , 0 } | 1 |
| ... | ... | ... | ... |

| SITUATION DETERMINATION ID | STATUS |
|---|---|
| 0 x 0 0 | NORMAL |
| 0 x 0 1 | CONTINUOUS MONITORING |
| 0 x 1 0 | CUMULATIVE NOTIFICATION |
| 0 x 1 1 | IMMEDIATE NOTIFICATION |

1051 — SITUATION DETERMINATION ID
1052 — STATUS

NORMAL, CONTINUOUS MONITORING: ANOMALY NOTIFICATION IS NOT OUTPUT

CUMULATIVE NOTIFICATION, IMMEDIATE NOTIFICATION: ANOMALY NOTIFICATION IS OUTPUT

INTRUSION ANOMALY MONITORING ANALYSIS DEVICE IN VEHICLE ENVIRONMENT THAT DETECTS AND RESPONDS TO SECURE BOOT PROCESSING TAMPERING

TECHNICAL FIELD

The present invention relates to an analysis device. More specifically, the present invention relates to the analysis device that performs anomaly detection based on a monitoring result of a monitoring-target device mounted on a vehicle, and particularly relates to the analysis device that determines whether to output an anomaly notification to an outside of the vehicle.

BACKGROUND ART

In order to manage security at operation after the shipment of vehicles, a security operation center (SOC) for automobiles has been studied. In the SOC, logs related to security events are collected from a vehicle, and an operator or an analyst of the SOC analyzes a situation of the vehicle and an influence on other vehicles based on the logs, and develops and executes a countermeasure policy. It is conceivable to use detection results of an attack detection device mounted on the vehicle as the security events collected from the vehicle.

The number of connected cars is increasing more and more, and the number of vehicles monitored by the SOC becomes large. In such an environment, as false detection by the attack detection device increases, an unnecessary workload on the operator or the analyst increases.

Therefore, reduction of the false detection is required as an attack detection technique. As a technique for improving the accuracy of the attack detection, PTL 1 discloses a technique for controlling a method of communication with the outside of a vehicle in accordance with the depth of intrusion of an unauthorized attack on an in-vehicle device.

CITATION LIST

Patent Literature

PTL 1: JP 2019-125344 A

SUMMARY OF INVENTION

Technical Problem

However, the conventional technique has a problem that an anomaly notification cannot be appropriately output.

According to the technique of PTL 1, it is expected to increase the accuracy of the attack in accordance with the depth of intrusion of the unauthorized attack on the in-vehicle device, that is, to reduce false detection. However, in a case where another attack event is detected after some time has elapsed from the first detected attack event, it is difficult to determine whether the detected event is false detection or an attack. For example, PTL 1 does not disclose a method for determining whether an attack event detected at a certain trip time and an attack event detected at a trip time after several times or several tens of times in a period (trip time) from start to stop of a vehicle are actual attacks or false detection.

The present invention has been made in view of the above problems, and an object of the present invention is to provide an analysis device that appropriately outputs an anomaly notification by reducing false detection of an attack event.

Solution to Problem

An example of an analysis device of the present invention configured to be communicable with a plurality of monitoring-target devices,
wherein the analysis device
collects monitoring results of each of the monitoring-target devices,
determines whether an anomaly has occurred in each of the monitoring-target devices, based on the monitoring results, and
determines whether to output an anomaly notification indicating the anomaly, based on a result of the determination and code verification results of each of the monitoring-target devices.

This specification contains the disclosure of Japanese Patent Application No. 2021 037773, which is the basis of the priority of the present application.

Advantageous Effects of Invention

The analysis device of the present invention can appropriately output an anomaly notification by reducing false detection of an attack event.

BRIEF DESCRIPTION OF DRAWINGS

FIG. 5 illustrates an example of log information collected from in-vehicle devices.

FIG. 7 illustrates an example of an influence range of the in-vehicle devices.

FIG. 8A illustrates an example of presence or absence of violation on each in-vehicle device.

FIG. 8B illustrates an example of situation information about all the vehicles.

FIG. 9 is a diagram illustrating an example of determination results of the vehicle situations obtained by the analysis device.

DESCRIPTION OF EMBODIMENT

Hereinafter, an embodiment of the present invention will be described in detail with reference to the drawings.

First Embodiment

The analysis device according to the present embodiment executes a method for determining a timing to notify an outside of a vehicle, based on anomalous log information acquired from an in-vehicle device. However, the technical idea of the present invention is not limited to this embodiment. For example, a function of detecting an anomaly and a function of determining the timing to notify the outside of the vehicle can be applied to an identical device.

Figure 1:
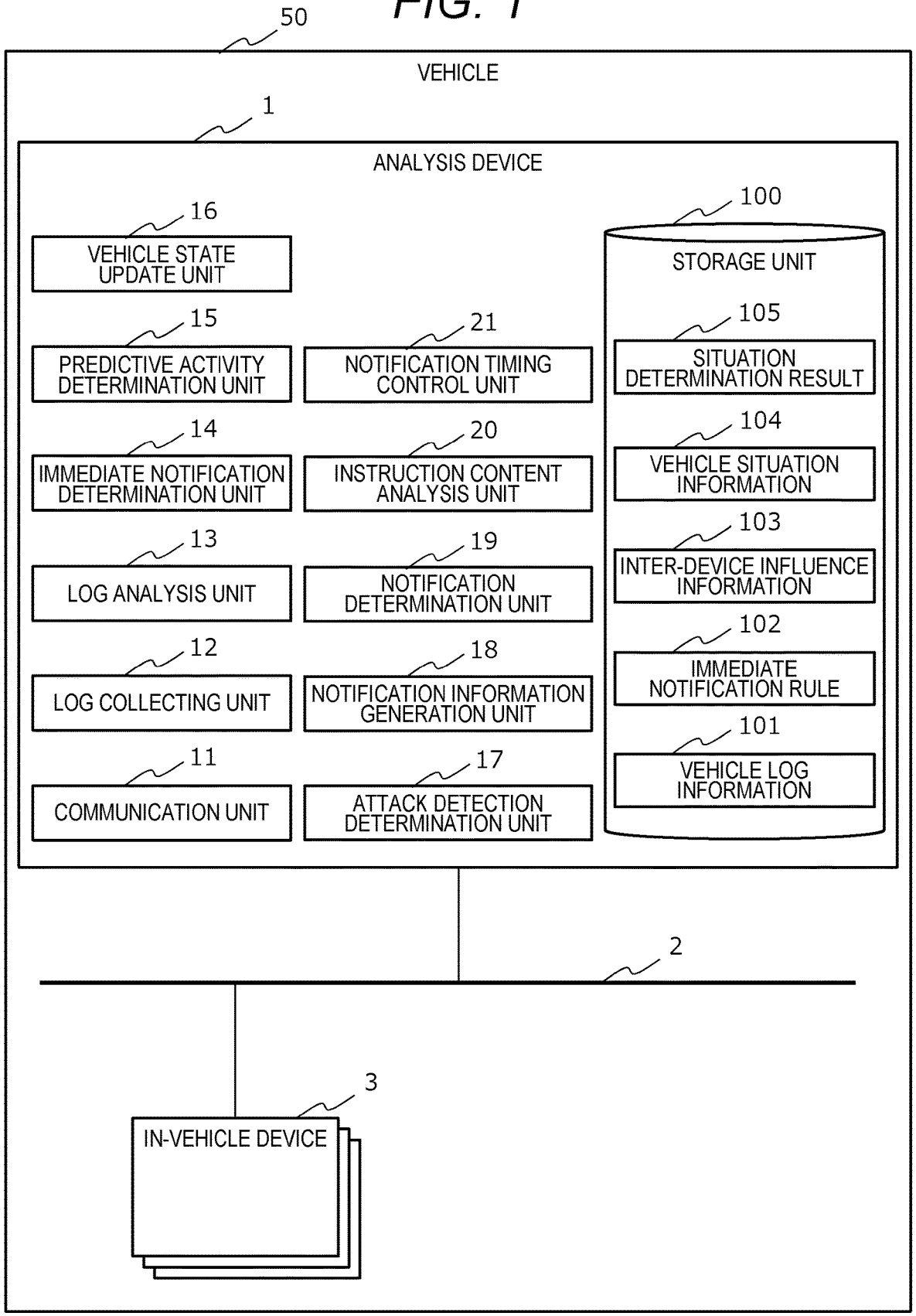
FIG. 1 illustrates a configuration of an analysis device according to a first embodiment of the present invention.

FIG. 1 illustrates a configuration of an analysis device 1 according to the present embodiment. The analysis device 1 is, for example, a device that is mounted on a vehicle 50 and analyzes information related to the vehicle 50. However, the analysis device 1 may not be mounted on the vehicle 50, and may be a device that analyzes information related to a target other than the vehicle 50.

The analysis device 1 is connected to in-vehicle devices 3 via a communication bus 2. The in-vehicle devices 3 is a device mounted on the vehicle 50, and is a monitoring-target device to be monitored by the analysis device 1 in the present embodiment. The analysis device 1 is communicably connected to the multiple in-vehicle devices 3.

The communication bus 2 may physically include multiple communication buses, and standards of the respective communication buses may be identical to or different from each other. The standards of these communication buses are controller area network (CAN: registered tradename), local internet network (LIN: registered tradename), FlexRay (registered tradename), Ethernet (registered tradename), and the like.

The analysis device 1 includes calculation means, not illustrated, and a storage means, not illustrated. The calculation means includes, for example, a central processing unit (CPU). The storage means includes, for example, a read only memory (ROM) and a random access memory (RAM). The calculation means executes a program stored in the storage means, and the analysis device 1 implements functions described in the present specification.

For example, the analysis device 1 includes, as functional units thereof, a log collecting unit 12, a log analysis unit 13, an immediate notification determination unit 14, a predictive activity determination unit 15, a vehicle state update unit 16, an attack detection determination unit 17, a notification information generation unit 18, a notification determination unit 19, an instruction content analysis unit 20, and a notification timing control unit 21. In this specification, the processing executed by the CPU or these functional units can also be executed by the analysis device 1.

The storage means further includes a storage unit 100. The storage unit 100 may be entirely nonvolatile or partially volatile storage unit. In addition, the analysis device 1 includes a communication unit 11 that is a communication interface and performs calculation necessary for communication.

A functional block diagram illustrated in FIG. 1 is an example, and the units and names of the functions are not limited thereto. For example, the function implemented by the log analysis unit 13 in the present embodiment may be implemented by another functional unit illustrated in FIG. 1 or may be implemented by a functional unit not illustrated in FIG. 1.

The communication unit 11 receives messages from the in-vehicle devices 3 via the communication bus 2 and transmits messages to the in-vehicle devices 3 via the communication bus 2. The analysis device 1 collects information (for example, information from which an anomalous state can be determined) from each of the in-vehicle devices 3 using the communication unit 11. Note that the analysis device 1 may collect not only logs from the in-vehicle devices 3 but also logs detected by itself and store them.

The log collecting unit 12 stores the information collected from the in-vehicle devices 3 in vehicle log information 101.

The log analysis unit 13 analyzes presence or absence of information indicating anomaly in the information collected from the in-vehicle devices 3. The immediate notification determination unit 14 determines whether the information indicating the anomaly falls under immediate notification rule 102. The predictive activity determination unit 15 determines whether the information indicating the anomaly is registered in vehicle situation information 104 for a predetermined period (for example, the latest trip time that has elapsed). The vehicle state update unit 16 updates the vehicle situation information 104 based on the information indicating the anomaly. The attack detection determination unit 17 determines confirmation of attack detection based on the vehicle situation information 104 and updates a situation determination result 105. The notification information generation unit 18 generates information to be notified to the outside of the vehicle 50. The notification determination unit 19 determines whether to notify the outside of the vehicle 50 based on the situation determination result 105. The instruction content analysis unit 20 analyzes an instruction content related to notification control received from the outside of the analysis device 1. The notification timing control unit 21 notifies the outside of the vehicle 50 about information on the detected anomaly at a predetermined timing.

The storage unit 100 has the following functional units:
The vehicle log information 101 retaining information acquired from the in-vehicle devices 3,
The immediate notification rule 102 for determining whether to immediately output the detected anomaly to the outside of the vehicle 50,
Inter-device influence information 103 indicating an influence relationship between the in-vehicle devices 3, and indicating, for example, a relationship between the in-vehicle device 3 related to the anomaly and another in-vehicle device 3 that may be an attack target,
The vehicle situation information 104 retaining the presence or absence of violation and violation state of each of the in-vehicle devices 3, and
The situation determination result 105 indicating the state of the vehicle 50 based on the vehicle situation information 104.

Similarly, the functional block diagram illustrated in FIG. 1 is an example of the storage unit 100, and the units and names of the functions are not limited thereto. For example, in the present embodiment, the information retained in the vehicle log information 101 may be retained by another functional unit in the storage unit 100 of FIG. 1, or may be retained by a functional unit not included in the storage unit 100 of FIG. 1.

Figure 2:
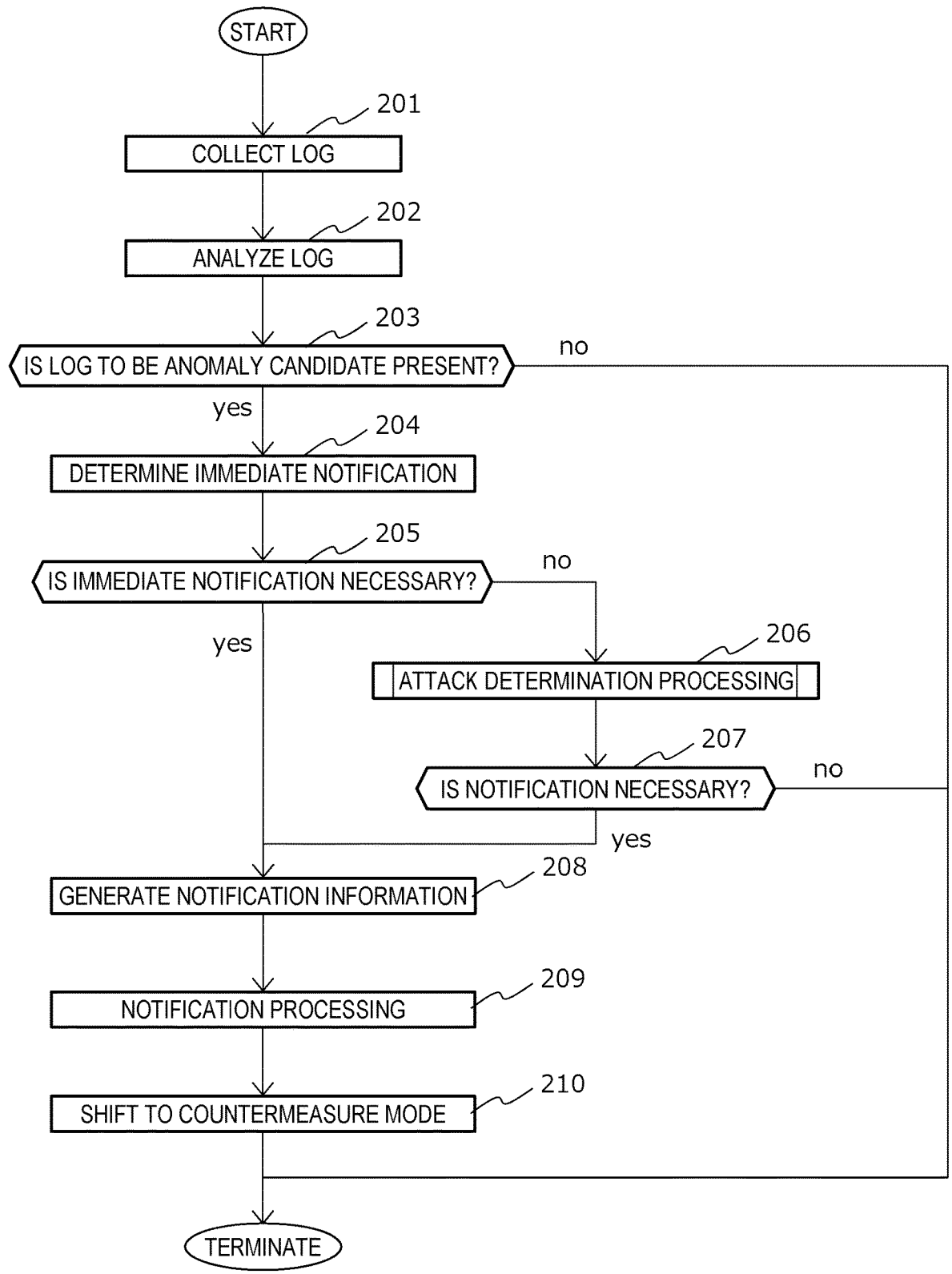
FIG. 2 is a flowchart illustrating outline processing for determining a timing of notification to an outside of a vehicle.

FIG. 2 is a flowchart illustrating processing for determining a timing at which the analysis device 1 notifies the outside of the vehicle 50 about an anomaly. An execution subject of each step described below is, for example, a CPU, not illustrated, of the analysis device 1.

In step 201, the log collecting unit 12 collects monitoring result of each of the in-vehicle devices 3 using the communication unit 11 and stores the monitoring results in the vehicle log information 101 of the analysis device 1. The monitoring results are collected as, for example, log information. For example, the log information may be collected periodically after the analysis device 1 is activated, the log information may be collected at a timing optionally set in advance, or the log information transmitted from the in-vehicle devices 3 may be received at timings determined by each of the in-vehicle devices 3. Further, the log collecting unit 12 may collect logs during a determined period. This determined period may include multiple trip times (or portions thereof), for example, may span multiple trip times. The case where the period spans multiple trip times is described. In a case where code verification results indicate that programs have not been tampered (alternatively, the code verification results do not indicate that the programs have tampered) when logs are first acquired from each of the in-vehicle devices 3 after the vehicle 50 or the analysis device 1 is activated, logs collected last time (for example, anomaly log) may be deleted. Alternatively, even during the period that spans the multiple trip times, the previous logs may be left as it is regardless of the code verification results, and the logs may be deleted after being notified to the outside of the vehicle 50.

FIG. 5 illustrates an example of the vehicle log information 101 retaining the log information collected in step 201. The logs included in the vehicle log information 101 are configured respectively for the in-vehicle devices. The logs each include an anomaly log (a log indicating that an anomaly has occurred), and the anomaly log includes the following information:

An anomaly ID 1011 of an identifier allocated to each type of anomaly log,

An anomaly content 1012 that is text data indicating a content of an anomaly log, An anomalous place 1013 indicating a place where an anomaly has occurred in the corresponding in-vehicle device 3, and A time 1014 indicating a time at which an anomaly is detected; the time 1014 that indicates whether the log is included in any portion of the operation period of the analysis device 1 or in any portion of the operation period of the vehicle 50. Note that the operation period of the analysis device 1 may be, for example, a period from the start to stop of the analysis device 1, and the operation period of the vehicle 50 may be, for example, a period from the start to stop of the vehicle 50.

Prior to step 201, each of the in-vehicle devices 3 can generate logs based on a known technique or the like. For example, in a case where access is made by a terminal that is not registered as a device outside the vehicle via a communication channel Ch1 monitored by an in-vehicle device A, the in-vehicle device A registers, in the log, an anomaly content 1012 "access by unregistered terminal", an anomaly ID "0x001" of the anomaly, an anomalous place 1013 "Ch1", and a detected time "02/01/2020 11:10:20". This log is collected in step 201.

In step 202, the log analysis unit 13 determines whether an anomaly log is included in the vehicle log information 101 stored in step 201 and extracts the anomaly log. That is, the log analysis unit 13 determines whether an anomaly has occurred in the each of the in-vehicle devices 3, based on the monitoring results of the in-vehicle devices 3. In the present embodiment, only the anomaly log is retained, but other log information may be retained, and in this case, an identifier that can identify the anomaly log may be provided. This determination can be made, for example, based on the anomaly ID 1011. In addition, the log information may include code verification results. Examples of the code verification results may include information indicating that occurrence of tampering is determined, information indicating that no tampering is determined, or the like.

In step 203, in a case where in step 202, the anomaly log is included, the processing proceeds to step 204. On the other hand, in a case where the anomaly log is not included, the processing is terminated. After the termination, the processing may proceed to step 201 at a predetermined timing. Note that, as a modification, also in a case where a log indicating the code verification result is included, the processing may proceed to step 204. In this case, in a case where a determination is made that no tampering has been performed as the code verification result, the processing may proceed to step 204.

In step 204, the immediate notification determination unit 14 determines, based on the immediate notification rule 102, whether an anomaly log to be immediately notified to the outside of the vehicle 50 exists in the anomaly log included in the vehicle log information 101.

Figure 6A:
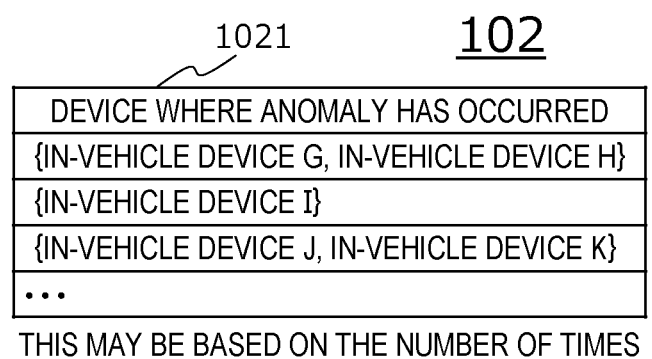
FIG. 6A illustrates an example of an immediate notification rule based on an anomalous device.

FIG. 6A illustrates an example of the immediate notification rule 102 referred to by the immediate notification determination unit 14 in step 204 described above. This example is based on an anomalous device 1021. For example, in a case where the in-vehicle device 3 related to the anomaly log corresponds to the anomalous device 1021 in the immediate notification rule 102, the immediate notification determination unit 14 determines that the immediate notification for the anomaly log is output. The immediate notification is a type of notification indicating anomaly (anomaly notification). The determination that the immediate notification about a certain anomaly log is output corresponds to a determination that an anomaly notification about the anomalous log is output.

In the example of FIG. 6A, a determination is made to output the immediate notification about an anomaly log related to an in-vehicle device I. Further, in a case where an anomaly log related to an in-vehicle device G and an anomaly log related to an in-vehicle device H exist at the same time or within a predetermined time, a determination is made to output the immediate notification about these anomaly logs.

In the example of FIG. 6A, the immediate notification determination unit 14 can determine whether to output the anomaly notification, based on the content of an anomaly (for example, a single anomaly) that has occurred in any of the in-vehicle devices 3 (an example of the in-vehicle device I). This makes it possible to reliably output the anomaly notification in a case where a serious anomaly occurs.

Further, the immediate notification rule 102 may include a condition that the anomaly log corresponding to the anomalous device 1021 is generated more than once. For example, the immediate notification determination unit 14 may further determine to output the immediate notification, based on the number of occurrence times of anomaly in any of the in-vehicle devices 3 within a predetermined period. For example, in a case where a plurality of anomaly logs related to one in-vehicle device 3 is present within a predetermined period, these anomaly logs may be determined as immediate notification targets. This prevents frequent anomalies from being overlooked.

Figure 6B:
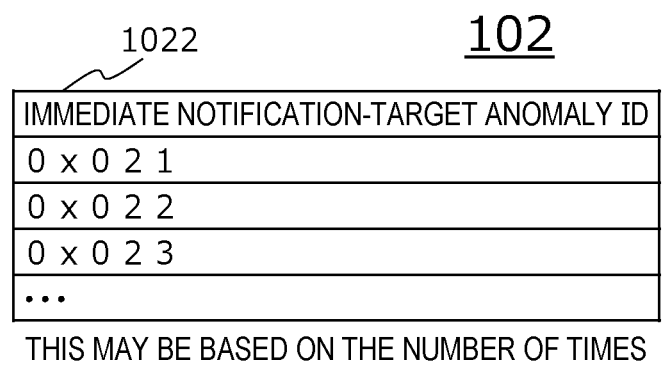
FIG. 6B illustrates an example of an immediate notification rule based on a log type.

FIG. 6B illustrates another example of the immediate notification rule 102 referred to by the immediate notification determination unit 14 in step 204 described above. This example is based on a type of an anomaly log. For example, in step 204, in a case where the anomaly ID 1011 corresponds to an immediate notification-target anomaly ID 1022, the immediate notification determination unit 14 determines to output the immediate notification.

Note that in the example of FIG. 6B, the immediate notification determination unit 14 can determine whether to output the anomaly notification, based on the content of single anomaly that has occurred in any of the in-vehicle devices 3. However, as a modification, the immediate notification rule 102 may include a condition that an anomaly log corresponding to the immediate notification-target anomaly ID 1022 is generated more than once. For example, the immediate notification determination unit 14 may further determine to output the immediate notification, based on the number of occurrence times of identical anomaly within a predetermined period. For example, in a case where a plurality of anomaly logs related to a certain anomaly ID is present within a predetermined period, these anomaly logs may be determined as immediate notification targets. This prevents frequent anomalies from being overlooked.

Only one of the rule illustrated in FIG. 6A and the rule illustrated in FIG. 6B may be used for the determination, or both of the rules may be used for the determination. In a case where both of the rules are used, a determination may be made to output the immediate notification about an anomaly log corresponding to either one rule, or a determination may be made to output the immediate notification about only the anomaly logs corresponding to both the rules.

In step 205, the immediate notification determination unit 14 proceeds to step 208 in a case where the determination is made in step 204 to output the immediate notification, and proceeds to step 206 in a case where the determination is made not to output the immediate notification.

In step 206, the attack detection determination unit 17 determines the presence or absence of an attack for the anomaly log extracted in step 202 described above, based on the vehicle situation information 104 to be described later, and determines whether to notify the outside of the vehicle. Details of this determination will be described later with reference to FIG. 3 and the like.

In step 207, the attack detection determination unit 17 determines whether to output the anomaly notification, based on the situation determination result 105 (described later with reference to FIG. 9 and the like). Note that the situation determination result 105 is generated based on whether an anomaly has occurred in each of the in-vehicle devices 3 (step 203 described above) and a code verification result of each of the in-vehicle devices 3 (step 302 described later).

Therefore, the attack detection determination unit 17 can determine whether to output the anomaly notification, based on a result of the determination whether an anomaly has occurred in each of the in-vehicle devices 3 and the code verification result of each of the in-vehicle devices 3.

Here, making the determination to output the anomaly notification made by the attack detection determination unit 17 corresponds to the determination that either of the vehicle 50 and the in-vehicle device 3 is under attack. Further, making the determination not to output the anomaly notification by the attack detection determination unit 17 corresponds to making a determination that either of the vehicle 50 and the in-vehicle device 3 is not under attack, or corresponds to making a determination that the vehicle 50 or the in-vehicle device 3 is likely to be attacked but should be continuously monitored for observing the state of things.

For example, in a case where a situation determination ID 1051 (described later with reference to FIG. 9 and the like) of the situation determination result 105 is "0x00" or "0x01", the determination is made not to output the anomaly notification, and in a case where it is "0x10" or "0x11", the determination is made to output the anomaly notification. The content of the anomaly notification to be output can be, for example, the immediate notification described above or a cumulative notification described later.

In a case where the determination is made to output the anomaly notification, the processing proceeds to step 208, and in a case where the determination is made not to output the anomaly notification, the processing flow is terminated.

In step 208, the notification information generation unit 18 generates an anomaly notification as information to be notified to the outside of the vehicle. For example, the anomaly notification may include information based on the vehicle log information 101, the vehicle situation information 104, and the situation determination result 105. Further, the anomaly notification may include information indicating that an attack has been detected.

In step 209, the notification determination unit 19 outputs the anomaly notification generated in step 208 to the outside of the vehicle 50. The output destination may be a device outside the vehicle 50, and in this case, communication may be performed via any of the in-vehicle devices 3. In addition, the output destination may be a device mounted on the vehicle 50, and for example, the detection of the attack may be recognized from the outside of the vehicle 50 by turning on a lamp mounted on the vehicle 50.

In step 210, the analysis device 1 shifts to a countermeasure mode for taking security measures for the vehicle 50, based on the situation determination result 105. The specific content of the operation in the countermeasure mode can be appropriately designed by those skilled in the art based on known techniques and the like. Note that step 210 may be omitted.

Through the above steps, the analysis device 1 can notify the outside of the vehicle about an anomaly at an appropriate timing of detecting the attack.

Figure 3:
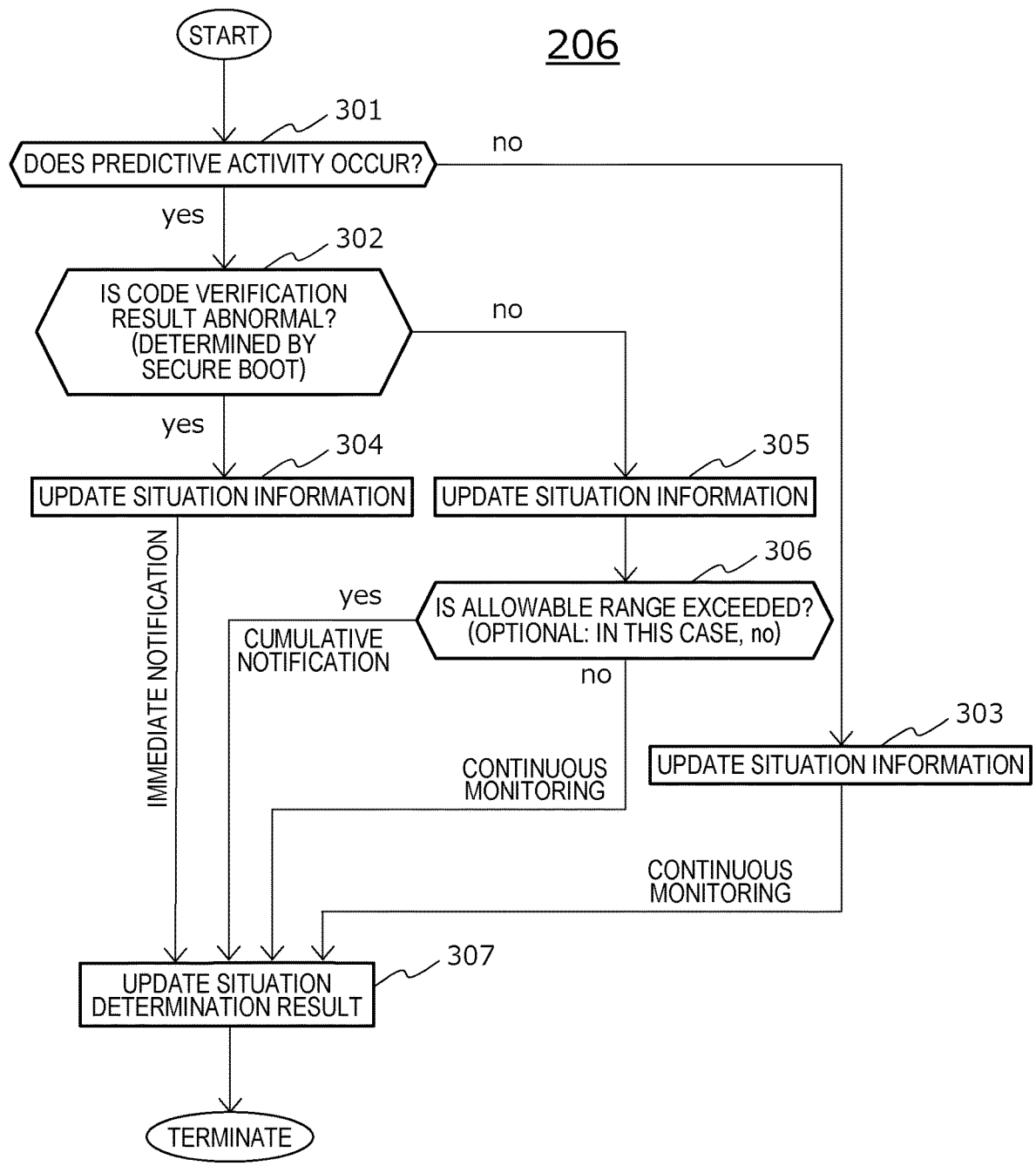
FIG. 3 is a flowchart illustrating details of step 206 in FIG. 2.

FIG. 3 is a detailed flowchart of the processing in step 206. An execution subject of each step described below is, for example, a CPU, not illustrated, of the analysis device 1. The processing in FIG. 3 is executed for each anomaly log except for step 307, for example, and step 307 is executed in response to execution of the processing in FIG. 2.

In step 301, the predictive activity determination unit 15 determines whether a predictive activity of an attack is recorded with reference to the vehicle situation information 104. Hereinafter, a specific processing example in step 301 will be described with reference to FIGS. 7, 8A, and 8B.

FIG. 7 illustrates an example of the inter-device influence information 103 that associates the in-vehicle device 3 (damaged device 1031) related to an anomaly log with the in-vehicle device 3 (affected destination 1032) to be affected by the anomaly.

The affected destination 1032 is related to the damaged device 1031 where the anomaly occurs, and is likely to be affected by the attack. Further, a monitoring-target group ID 1033 is identification information for identifying a group including the damaged device 1031 and the affected destination 1032.

For example, as for the anomaly log with the anomaly ID 1011 of "0x002" illustrated in FIG. 5, the predictive activity determination unit 15 specifies the in-vehicle device "in-vehicle device A" in which the anomaly ID is registered as a damaged device, and specifies the affected destination 1032 "in-vehicle device D" corresponding to the in-vehicle device A in the damaged device 1031 of the inter-device influence information 103.

FIG. 8A illustrates an example of the vehicle situation information 104 in which a predictive activity is recorded. The vehicle situation information 104 includes an in-vehicle device ID 1041 for identifying the in-vehicle device 3 mounted on the vehicle 50, and presence or absence of violation 1042 indicating whether the in-vehicle device has been violated.

The vehicle situation information 104 of FIG. 8A can be generated prior to the execution of step 301. For example, "1" can be recorded for the in-vehicle device 3 in which an anomaly occurs within a predetermined period (situation information recording period), and "0" can be recorded for the in-vehicle device 3 in which no anomaly occurs within the predetermined period.

Since the occurrence of the anomaly suggests the possibility of an attack predictive activity, the information indicating whether the anomaly has occurred within the situation information recording period can be said to be information indicating whether the attack predictive activity is carried out in each of the in-vehicle devices 3.

The start point and end point of the situation information recording period can be optionally designed, but may be, for example, an operation period of the vehicle 50 (for example, a period from the start to stop of the vehicle or an operation period of the analysis device 1 (for example, a period from the start to stop of the analysis device 1). This makes it possible to match the recording of the anomaly log with the operation period of the analysis device 1 or the vehicle 50 and to make more appropriate determination.

Furthermore, the situation information recording period may be a period determined based on a specific event signal, or may be a period based on a predetermined time.

The vehicle situation information 104 can be designed to be updated at any timing. For example, it may be updated in response to the end of the situation information recording period. For example, the vehicle situation information 104 retains information regarding a first situation information recording period. In this case, when a second situation information recording period ends, the vehicle situation information 104 may be updated to a content corresponding to the second situation information recording period. Note that the situation determination result 105 can be initialized at any timing. For example, in a case where the trip time has changed (that is, in a case where the previous trip time ends and a new trip time starts), the situation determination result 105 may be maintained, or may be initialized, that is, set to "0x00". The situation determination result 105 may be initialized in a case where a predetermined procedure (for example, it is confirmed that there is no problem by a security operation center (SOC), a program having a problem is corrected, or the like) is performed from the outside of the vehicle 50. Alternatively, the situation determination result 105 may be initialized in a case where logs indicating no tampering is collected as the code verification results from all the in-vehicle devices 3 or corresponding in-vehicle devices 3.

In step 301, for example, as for an anomaly log having the anomaly ID 1011 of "0x002" illustrated in FIG. 5, the predictive activity determination unit 15 first determines whether a predictive activity is carried out in an in-vehicle device (in this case, the in-vehicle device A) related to the anomaly log. For example, if the value of the presence or absence of violation 1042 corresponding to the in-vehicle device A is "1", the determination is made that the predictive activity has been carried out, and if the value is "0", the determination is made that no predictive activity has been carried out. In this example, since the value of the presence or absence of violation 1042 corresponding to the in-vehicle device ID 1041 of "in-vehicle device A is "0", the determination is made that no predictive activity has been carried out in the in-vehicle device A.

Next, the predictive activity determination unit 15 specifies the in-vehicle device D as the affected destination based on the inter-device influence information 103 as described above, and determines whether a predictive activity has been carried out in the in-vehicle device D. For example, if the value of the presence or absence of violation 1042 corresponding to the in-vehicle device D is "1", the determination is made that a predictive activity has been carried out, and if the value is "0", the determination is made that no predictive activity has been carried out. In this example, since the value of the presence or absence of violation 1042 corresponding to the in-vehicle device ID 1041 of "in-vehicle device D is "1", the determination is made that a predictive activity has been carried out in the in-vehicle device D.

In addition, for example, regarding the anomaly log related to the in-vehicle device C, in a case where the damaged device 1031 is the in-vehicle device C in FIG. 7, a group including the in-vehicle device D and an in-vehicle device E and a group including only an in-vehicle device F are associated with each other as the affected destination 1032. Therefore, in the anomaly log related to the in-vehicle device C, in a case where either or both of the presence or absence of violation 1042 corresponding to the in-vehicle device D and the presence or absence of violation 1042 corresponding to the in-vehicle device E is or are "1", a determination is made that a predictive activity has been carried out in either or both of the in-vehicle device D and the in-vehicle device E. In a case where both of them are "0", a determination is made that no predictive activity has been carried out in the in-vehicle device D and the in-vehicle device E. Further, in a case where the presence or absence of violation 1042 corresponding to the in-vehicle device F is "1", a determination is made that a predictive activity has been carried out in the in-vehicle device F, and in a case where it is "0", a determination is made that no predictive activity has been carried out in the in-vehicle device F.

The predictive activity determination unit 15 may determine the presence or absence of a predictive activity for all the anomaly logs as described above. Further, in step 202 described above, the predictive activity determination unit 15 may identify a damaged device where an anomaly has occurred, based on the anomaly log extracted from the vehicle log information 101, identify an influence range of the damaged device using the inter-device influence information 103, and determine presence or absence of an attack prediction with reference to the presence or absence of violation 1042 regarding the in-vehicle device ID 1041 corresponding to the damaged in-vehicle device and the in-vehicle device included in the influence range.

As a result of the determination in step 301, in a case where the determination is made that a predictive activity has been carried out in any of the in-vehicle devices, the processing proceeds to step 302, and in a case where the determination is made that no predictive activity has been carried out, the processing proceeds to step 303.

In step 302, the attack detection determination unit 17 refers to the code verification results. For example, the attack detection determination unit 17 refers to the code verification result of the in-vehicle device 3 where the determination is made in step 301 that the predictive activity has been carried out. Although a specific example of the code verification result is not particularly illustrated, the code verification result indicates, for example, whether the program executed by the in-vehicle device 3 has been tampered, and can be generated based on a known technique or the like. Note that in a case where the log acquired in step 201 is a log indicating the code verification result (for example, presence or absence of tampering) of the in-vehicle device 3, a determination may be made in step 302 whether the content of the log indicates that tampering has been performed. For example, when the vehicle 50 is activated (or when the analysis device 1 is activated), the analysis device 1 may collect the code verification result (presence or absence of tampering) of each of the in-vehicle devices 3 from each of the in-vehicle devices 3 in step 201, and determine the code verification results in step 302.

The code verification results are generated by, for example, secure boot processing. The secure boot processing is processing for determining whether programs executed by the in-vehicle devices 3 have been tampered at the start of execution of the programs. Note that the code verification results are not limited to the results obtained by the secure boot processing, and may be results of verification executed at any timing after the start of execution of the programs.

In a case where the determination is made that the programs executed by the in-vehicle devices 3 where the predictive activities have been carried out have been tampered, the processing proceeds to step 304. Otherwise, the processing proceeds to step 305.

In steps 303, 304, and 305, the vehicle state update unit 16 updates the vehicle situation information 104 based on a new anomaly log extracted from the vehicle log information 101.

FIG. 8B illustrates an example of the vehicle situation information 104 updated in step 303. In the present embodiment, the vehicle situation information 104 includes both the information illustrated in FIG. 8A and the information illustrated in FIG. 8B, but these pieces of information may be included in respective different areas (for example, different databases, RAMS, or DataFlash).

The vehicle situation information 104 illustrated in FIG. 8B includes the following information:
A monitoring-target group ID 1043 that identifies a group of mutually relevant devices,
Relevant devices 1044 indicating the in-vehicle devices included in respective groups, the relationship between the devices included in the respective groups may correspond to the inter-device influence information 103 in FIG. 7; and in the present embodiment, the relationship illustrated in FIG. 8B corresponds to the relationship illustrated in FIG. 7, but they do not need to correspond to each other in the modification,
A violation situation 1045 indicating a violation situation in each in-vehicle device, and
A threshold 1046 indicating a threshold used when a determination is made whether to output an anomaly notification, based on the violation situation 1045.

The vehicle state update unit 16 updates the presence or absence of violation 1042 corresponding to the in-vehicle device (for example, the in-vehicle device A) related to the anomaly log from "0" to "1". For example, as for the anomaly log related to the in-vehicle device A, the ID {0x01} of the group in which the in-vehicle device A is the damaged device 1031 is acquired from the monitoring-target group ID 1033 of FIG. 7. If the violation situation 1045 (in the example of FIG. 8B, {1, 1}.) of the corresponding group in FIG. 8B is {0, 0}, this is updated to {1, 0}.

In step 306, the attack detection determination unit 17 compares the violation situation 1045 in the vehicle situation information 104 with the threshold 1046. For example, for each group, the sum of the numbers included in the violation situation 1045 is compared with the threshold. In a case where the sum exceeds the threshold, a determination is made to output the cumulative notification. The cumulative notification is a type of anomaly notification. In a case where the sum does not exceed the threshold, a determination is made not to output the anomaly notification.

Note that, as a modification, the determination in step 306 may be omitted, and in that case, a determination may be made not to output the anomaly notification (similar to the case where the sum does not exceed the threshold).

In step 307, the vehicle state update unit 16 updates the situation determination result 105 in accordance with the result of steps 303, 304, or 306.

FIG. 9 illustrates an example of the situation determination result 105. The situation determination result 105 includes a situation determination ID 1051 for identifying the situation of the vehicle and a status 1052 indicating the situation content of the vehicle.

For example, as an initial state (for example, a state where no anomaly log is recorded), the situation determination ID 1051 is "0x00", and the status 1052 indicates "normal".

In a case where step 303 has been performed before step 307, the situation determination ID 1051 indicates "0x01", and the status 1052 indicates "continuous monitoring".

In a case where step 304 has been performed before step 307, the situation determination ID 1051 indicates "0x11", and the status 1052 indicates "immediate notification".

In a case where step 306 has been performed before step 307 and the sum has exceeded the threshold, the situation determination ID 1051 indicates "0x10", and the status 1052 indicates "cumulative notification". In a case where step 306 has been performed before step 307 and the sum has not exceeded the threshold, the situation determination ID 1051 indicates "0x01", and the status 1052 indicates "continuous monitoring".

Note that, in a case where the results of a plurality of the anomaly logs are different, priority is given to the maximum value of the results for the situation determination ID 1051. For example, in a case where "continuous monitoring" (the situation determination ID 1051 is "0x01") is determined for a certain anomaly log, and "immediate notification" (the situation determination ID 1051 is "0x11") is determined for another anomaly log, the situation determination ID 1051 is "0x11" as a result.

As illustrated in FIG. 9, in the present embodiment, the anomaly notification includes a cumulative notification related to the number of occurrence times of anomaly and an immediate notification related to the content of caused anomaly.

The anomaly notification may include information indicating whether the anomaly notification is the cumulative notification or the immediate notification. In this way, a more detailed content of the anomaly can be output.

The above processing enables the analysis device 1 to determine whether to output the anomaly notification to the outside of the vehicle. In a case where the determination is made to output the anomaly notification, the anomaly notification can be output to the outside of the vehicle at an appropriate timing for leading to early countermeasure.

According to steps 301, 302, and 304 of FIG. 3, the analysis device 1 determines to output the anomaly notification in a case where a determination is made that a predictive activity has been carried out (that is, an anomaly has occurred within a predetermined period) and tampering has been performed in any of the in-vehicle devices 3. Therefore, more appropriate determination can be made based on the past predictive activity and the latest code verification result.

Figure 4:
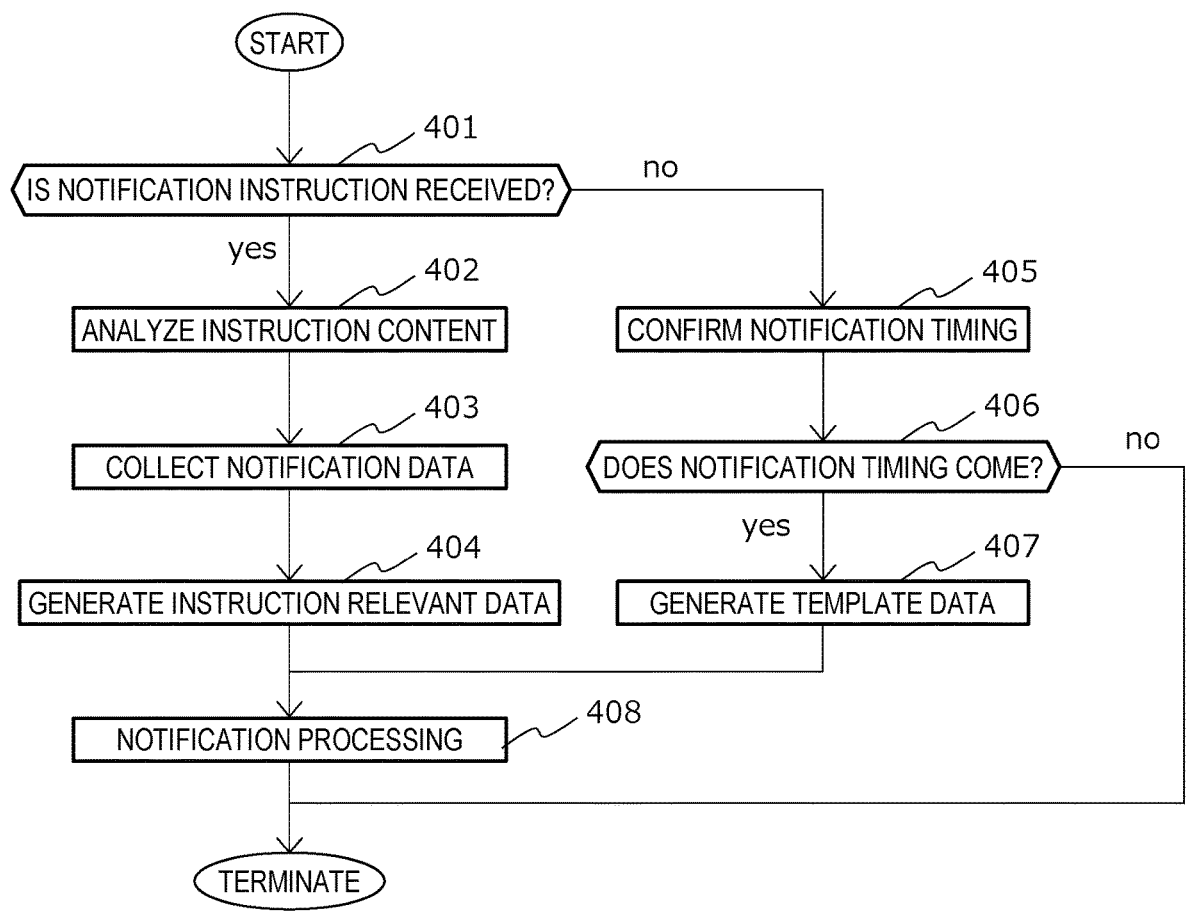
FIG. 4 is a flowchart illustrating outline processing for notification to the outside of the vehicle.

FIG. 4 is a flowchart illustrating an example of processing in which the analysis device 1 outputs information about the in-vehicle device to the outside of the vehicle. The analysis device 1 may output the anomaly notification through the processing illustrated in FIG. 4 in addition to or instead of step 209 illustrated in FIG. 2.

In FIG. 4, in particular, a case of outputting the anomaly notification as a regular report and a case of outputting the anomaly notification in accordance with an instruction from the outside of the vehicle will be described. An execution subject of each step described below is, for example, a CPU, not illustrated, of the analysis device 1. Further, this processing is executed, for example, when the vehicle 50 is activated. Furthermore, this processing may be executed at a predetermined timing, may be executed periodically and repeatedly, or may be executed after notification of anomaly.

In step 401, the instruction content analysis unit 20 checks whether a notification instruction has been received from the outside of the vehicle. In a case where the notification instruction has been received, the processing proceeds to step 402, and in a case where the notification instruction has not been received, the processing proceeds to step 405.

In step 402, the instruction content analysis unit 20 analyzes the instruction content received from the outside of the vehicle. For example, the instruction content includes information for designating information to be output to the outside of the vehicle. For example, the instruction content may include designation for a specific in-vehicle device, designation for specific log information, designation for log information to be additionally collected from another in-vehicle device, and designation for other information retained in the vehicle. The instruction content may further include information for changing the function or configuration of the analysis device 1.

In step 403, the notification information generation unit 18 collects necessary information from the analysis device 1 or the in-vehicle devices 3 based on the content analyzed in step 402.

In step 404, the notification information generation unit 18 generates information to be output to the outside of the vehicle from the information collected in step 403.

In step 405, the notification timing control unit 21 checks whether the current time is a predetermined timing of notification. For example, the predetermined timing may be a timing at which a predetermined event or processing occurs (for example, at the time of activation), or a predetermined date and time.

In step 406, the notification timing control unit 21 proceeds to step 407 in a case where a determination is made that the current time is the predetermined timing, based on the checked result of step 405 described above, and terminates the processing in other cases.

In step 407, the notification information generation unit 18 generates template data to be output to the outside of the vehicle. For example, information including a part or all of the pieces of information retained in the storage unit of the analysis device 1 is generated.

In step 408, the notification determination unit 19 outputs the information generated in step 404 or 407 to the outside of the vehicle. An output destination can be designed similarly to step 209 in FIG. 2.

According to the above processing, the analysis device 1 determines whether to output the anomaly notification based on the determination result regarding whether the anomaly of each of the in-vehicle devices 3 have occurred and the code verification result of each of the in-vehicle devices 3.

In addition, for example, predetermined information can be notified periodically at a timing in consideration of an operation load and a data communication cost on the center side, and additional information can be notified flexibly in accordance with a request instruction from the outside of the vehicle in a situation where a determination is made that an attack has occurred.

Therefore, the analysis device 1 can output the anomaly notification to the outside of the vehicle at an appropriate timing based on the anomaly log acquired from the in-vehicle device and the immediate notification rule.

More specifically, the analysis device 1 can determine that an attack is being received, based on the anomaly log and the predictive activity, and output the anomaly notification to the outside of the vehicle.

In addition, regardless of the code verification result, the anomaly notification can be output to the outside of the vehicle based on the degree of violation of the vehicle situation. As a result, in a case where an anomaly log requiring urgency is detected, the anomaly notification can be immediately output.

Further, according to the first embodiment, the number of cases where notification is output when an attack is not made can be reduced, and on the other hand, it becomes difficult to overlook a case having a high possibility of an attack. Therefore, the load at a time of cooperation with a center service such as the SOC can be optimized.

Furthermore, according to the first embodiment, since the code verification result can be generated by the secure boot processing, the result of the secure boot processing can be effectively utilized.

Further, according to the modification in which step 306 of the first embodiment is omitted, the analysis device 1 determines not to output the anomaly notification in a case where the determination is made that no tampering has been carried out in any of the in-vehicle devices 3. In this case, false detection of an attack based on the anomaly log can be reduced.

In the first embodiment, the processing in FIGS. 2 and 3 is an example, and can be appropriately changed. For example, the criterion of the determination in step 204, the criterion of the determination in step 302, and the like can be optionally changed. Further, for example, step 301 may be omitted, and step 302 may be always executed in step 206.

Furthermore, the format of the information used for the determinations can be added, omitted, or changed as appropriate. For example, the information in FIGS. 6A, 7, and 8B may be omitted, and in this case, a damaged device may be identical to a device of the affected destination.

REFERENCE SIGNS LIST 1 analysis device
3 in-vehicle device (monitoring-target device)

All publications, patents, and patent applications cited herein are hereby incorporated by reference in their entirety.

The invention claimed is:

1. An analysis device configured to be communicable with a plurality of monitoring-target devices,
    wherein the analysis device
    collects monitoring results of each of the plurality of monitoring-target devices, the monitoring results comprising anomaly-related information associated with each of the plurality of monitoring-target devices,
    determines whether an anomaly has occurred in each of the plurality of monitoring-target devices, based on the monitoring results,
    executes secure boot processing on each of the plurality of monitoring-target devices, determines, in response to executing the secure boot processing, code verification results indicative of whether programs executed by the plurality of monitoring-target devices have been tampered, at start of execution of the programs, and determines whether to output an anomaly notification indicating the anomaly, based on whether the anomaly has occurred in at least one of the plurality of monitoring-target devices and the code verification results indicates that the programs executed by any of the plurality of monitoring-target devices have been tampered.

2. The analysis device according to claim 1, wherein each of the plurality of monitoring-target devices is mounted on a vehicle.

3. The analysis device according to claim 2, wherein the analysis device determines to output the anomaly notification in a case where the determination is made that the anomaly has occurred and tampering has been performed in any of the plurality of monitoring-target devices within a predetermined period.

4. The analysis device according to claim 2, wherein the analysis device determines not to output the anomaly notification in a case where the determination is made that no tampering has been performed in any of the plurality of monitoring-target devices.

5. The analysis device according to claim 1, wherein the analysis device further determines whether to output the anomaly notification based on a number of occurrence times of anomaly or a number of occurrence times of identical anomaly in any of the plurality of monitoring-target devices within a predetermined period.

6. The analysis device according to claim 1, wherein the analysis device further determines whether to output the anomaly notification based on a content of the anomaly that has occurred in any of the plurality of monitoring-target devices.

7. The analysis device according to claim 3, wherein the predetermined period is an operation period of the vehicle on which the plurality of monitoring-target devices is mounted or an operation period of the analysis device.

8. The analysis device according to claim 1, wherein the anomaly notification includes a cumulative notification related to a number of occurrence times of the anomaly and an immediate notification related to a content of the anomaly that has occurred, and wherein the anomaly notification includes information indicating whether the anomaly notification is the cumulative notification or the immediate notification.

* * * * *